(No Model.)
G. HAIN.
HOE.
No. 386,197. Patented July 17, 1888.
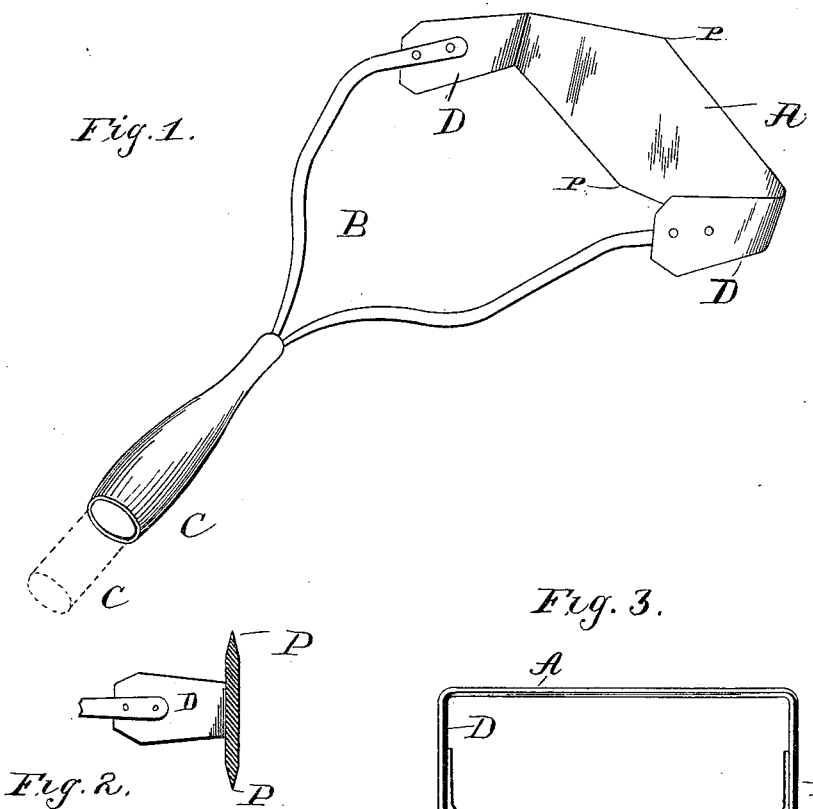
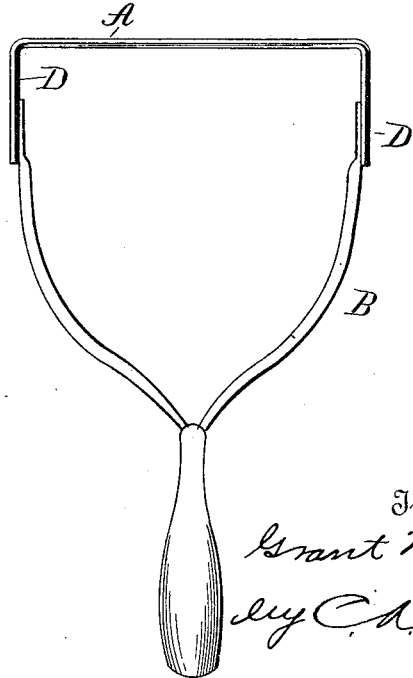
Witnesses.
Frank S. Ohr
J. H. Diggers
Inventor.
Grant Hain
by C. A. Snow & Co.
Attorneys.

UNITED STATES PATENT OFFICE.

GRANT HAIN, OF DAILEY, MICHIGAN.

HOE.

SPECIFICATION forming part of Letters Patent No. 386,197, dated July 17, 1888.

Application filed March 10, 1888. Serial No. 266,825. (No model.)

*To all whom it may concern:*

Be it known that I, GRANT HAIN, a citizen of the United States, residing at Dailey, in the county of Cass and State of Michigan, have invented a new and useful Improvement in Hoes, of which the following is a specification.

My invention relates to improvements in hoes; and it has for its object to provide a blade for hoes which is especially adapted for cutting weeds, grass, &c., from horizontal surfaces, and having additional cutters to trim the edges of grass-plots and other places where it is necessary to make a vertical cut.

With these objects in view the invention consists in a certain novel construction and arrangement of devices, fully set forth hereinafter in connection with the accompanying drawings, wherein—

Figure 1 is a perspective view of the improved hoe. Fig. 2 is a transverse central section of the same. Fig. 3 is a plan view.

Referring to the drawings, A designates the blade. B designates the fork, which is attached to the blade, and C designates the handle, (a portion of which is shown in dotted lines in the drawings,) which is secured to the said fork. The front and rear edges of the blade are tapered toward their centers to form points P P, and it will be seen that the points thus formed enable the blade to be forced through or under the grass or weeds more readily than if its edges were straight. Further, both the front and rear edges of the blade are sharpened. The ends of the blade are turned up at right angles to form the vertical blades D D, which also have their front and rear edges sharpened. The arms of the fork B are attached to the upper ends of the said blades.

It will now be apparent that with the horizontal portion of the blade weeds and grass may be cut from the surface of the ground as a path, and when it is desired to trim the edge or border of a grass-plot one of the vertical blades is used. A further object of the said vertical cutting-blades is to enable plants, when too numerous, to be thinned out, and, further, to enable the depth at which the horizontal blade is cutting to be gaged or regulated.

The advantage derived by the double-tapered horizontal blade is obvious, and therefore it is unnecessary to further enlarge thereon herein.

I am also aware that it is not new to turn or bend the ends of horizontal blades up to form ears to which to attach the forks of the handle; but it will be seen that I provide blades which are sharpened on their front and rear edges to enable the edge of a grass-plot to be squared by either a forward or a backward thrust of the hoe. The said vertical blades are further slightly tapered toward their lower ends to enable them to cut the edge of the grass without tearing the same up, as it would be liable to do if the blades were provided with parallel edges or tapered in the opposite direction.

Having described my invention, I claim—

The herein-described hoe-blade comprising the wedge-shaped horizontal blade A, and the integral vertical blades D D at the ends of the horizontal blade and tapered toward their lower ends, substantially as specified.

In testimony that I claim the foregoing as my own I have hereto affixed my signature in presence of two witnesses.

GRANT HAIN.

Witnesses:
CHESTER WHITE,
SCHUYLER C. HAIN.